(12) United States Patent
Guo et al.

(10) Patent No.: US 12,288,356 B2
(45) Date of Patent: Apr. 29, 2025

(54) SYSTEMS INCLUDING BOUNDING BOX CHECKER FOR OBJECT DETECTION MARKING

(71) Applicant: Renesas Electronics Corporation., Tokyo (JP)

(72) Inventors: Shijia Guo, Troy, MI (US); Stefan Geldreich, Dusseldorf (DE)

(73) Assignee: Renesas Electronics Corporation, Tokyo (JP)

( * ) Notice: Subject to any disclaimer, the term of this patent is extended or adjusted under 35 U.S.C. 154(b) by 460 days.

(21) Appl. No.: 17/718,584

(22) Filed: Apr. 12, 2022

(65) Prior Publication Data
US 2023/0326071 A1    Oct. 12, 2023

(51) Int. Cl.
*G06T 7/73* (2017.01)

(52) U.S. Cl.
CPC ...... *G06T 7/74* (2017.01); *G06T 2207/10016* (2013.01); *G06T 2207/30248* (2013.01)

(58) Field of Classification Search
CPC ............. G06T 7/74; G06T 2207/10016; G06T 2207/30248; G06T 2207/20081; G06T 7/73; G06T 7/13; G06T 7/90; G06T 2207/30148; G06V 10/25; G06V 20/70; G06V 20/56
See application file for complete search history.

(56) References Cited

U.S. PATENT DOCUMENTS

| | | | |
|---|---|---|---|
| 2019/0370606 A1* | 12/2019 | Kehl | G06V 10/82 |
| 2020/0380305 A1* | 12/2020 | Sharma | G06V 20/56 |
| 2021/0150707 A1* | 5/2021 | Weisenfeld | G16B 40/00 |
| 2021/0223780 A1* | 7/2021 | Bramley | G05D 1/0088 |
| 2022/0172390 A1* | 6/2022 | Redford | G06T 7/593 |
| 2022/0188695 A1* | 6/2022 | Zhu | G06N 20/00 |

* cited by examiner

*Primary Examiner* — Gandhi Thirugnanam
*Assistant Examiner* — Anna Lei
(74) *Attorney, Agent, or Firm* — SCULLY, SCOTT, MURPHY & PRESSER, P.C.

(57) ABSTRACT

Systems and methods for evaluating a set of bounding boxes in a blended image are described. A system can include an integrated circuit configured to obtain expected bounding box data. The expected bounding box data can be based on coordinates data of an image. The integrated circuit can determine target coordinates based on the expected bounding box data. The integrated circuit can receive a blended image including a set of objects and a set of bounding boxes. The integrated circuit can extract pixel values located at the target coordinates in the blended image. The integrated circuit can identify an error relating to the set of bounding boxes based on the extracted pixel values and the expected bounding box data.

20 Claims, 11 Drawing Sheets

SYSTEMS INCLUDING BOUNDING BOX CHECKER FOR OBJECT DETECTION MARKING

BACKGROUND OF THE SPECIFICATION

The present disclosure relates in general to apparatuses and methods for object detection systems, particularly, a bounding box checker for object detection marking.

A vehicle can be equipped with various types of sensors that facilitate detection of objects surrounding the vehicle. For example, the vehicle can include lasers, sonar, radar, cameras, and other sensors and devices that scan and record data from the vehicle's surroundings. Data collected by these sensors and devices, individually or in combination, can be used for identifying objects surrounding the vehicle. Attributes of the identified objects, such as size and shape, can be used by drivers to control the vehicle to safely maneuver to avoid the identified objects. For example, a vehicle's surrounding scenery can be shown on a display with markings on relevant objects and a driver can maneuver the vehicle to avoid collision with the marked objects.

SUMMARY

In an embodiment, an integrated circuit for evaluating a set of bounding boxes in a blended image is generally described. The integrated circuit can include a processor. The processor can be configured to obtain expected bounding box data. The expected bounding box data can be based on coordinates data of an image. The processor can be further configured to determine target coordinates based on the expected bounding box data. The processor can be further configured to receive a blended image including a set of objects and a set of bounding boxes. The processor can be further configured to extract pixel values located at the target coordinates in the blended image. The processor can be further configured to identify an error relating to the set of bounding boxes based on the extracted pixel values and the expected bounding box data.

In another embodiment, a system for evaluating a set of bounding boxes in a blended image is generally described. The system can include a processor configured to generate a bounding box image corresponding to an image. The processor can be further configured to combine the bounding box image with the image to generate a blended image including a set of objects and a set of bounding boxes. The system can further include an integrated circuit connected to the processor. The integrated circuit can be configured to obtain expected bounding box data. The expected bounding box data can be based on coordinates data of the image. The integrated circuit can be further configured to determine target coordinates based on the expected bounding box data. The integrated circuit can be further configured to receive the blended image from the processor. The integrated circuit can be further configured to extract pixel values located at the target coordinates in the blended image. The integrated circuit can be further configured to identify an error relating to the set of bounding boxes based on the extracted pixel values and the expected bounding box data.

In another embodiment, a method for evaluating a set of bounding boxes in a blended image is generally described. The method can include obtaining expected bounding box data. The expected bounding box data can be based on coordinates data of an image. The method can further include determining target coordinates based on the expected bounding box data. The method can further include receiving a blended image including a set of objects and a set of bounding boxes. The method can further include extracting pixel values located at the target coordinates in the blended image. The method can further include identifying an error relating to the set of bounding boxes based on the extracted pixel values and the expected bounding box data.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

In an aspect, a vehicle can output a blended image on a display, where the blended image can include images of surrounding objects (e.g., objects surrounding the vehicle) with bounding boxes encompassing the surrounding objects. The blended image can be a combination of a bounding box image and an image of the surrounding objects. In an aspect, the bounding boxes in the blended image can serve as visual alerts to notify the vehicle operator regarding specific objects that may require the vehicle operator's attention. In an aspect, the blended image can be among a plurality of images or frames of a video. As the video progresses from one blended image to another blended image, the positions of the surrounding objects and corresponding bounding boxes will change as well. Precision of the bounding boxes in the blended image is critical because inaccurate positions of the bounding boxes can confuse the vehicle operator's interpretation of the surroundings of the vehicle.

A precision of the positions of the bounding boxes in the blended image can be checked or evaluated by a computing system of the vehicle. The bounding boxes in the bounding box image can have one or more predefined properties, such as shapes, sizes, and distances between edges of the bounding boxes and corresponding detected objects can be predefined as well. The computing system of the vehicle can check the precision of the bounding boxes by evaluating whether the bounding boxes in the blended image are compliant with the predefined properties. The apparatus, methods, and systems presented herein can provide hardware mechanisms on a system on chip (SoC) module of a vehicle to evaluate the precision of bounding boxes in blended images. The utilization of the disclosed hardware mechanisms can evaluate bounding boxes in blended images without a need for users to verify the precision of the bounding boxes using software. Further, the disclosed hardware mechanisms allow the blended image, and a verified image after the evaluation, to be directly output to a display of the vehicle. Furthermore, the disclosed hardware mechanism can preserve bandwidth and avoid software systematic faults since a need to implement software safety mechanisms can be eliminated.

Figure 1:
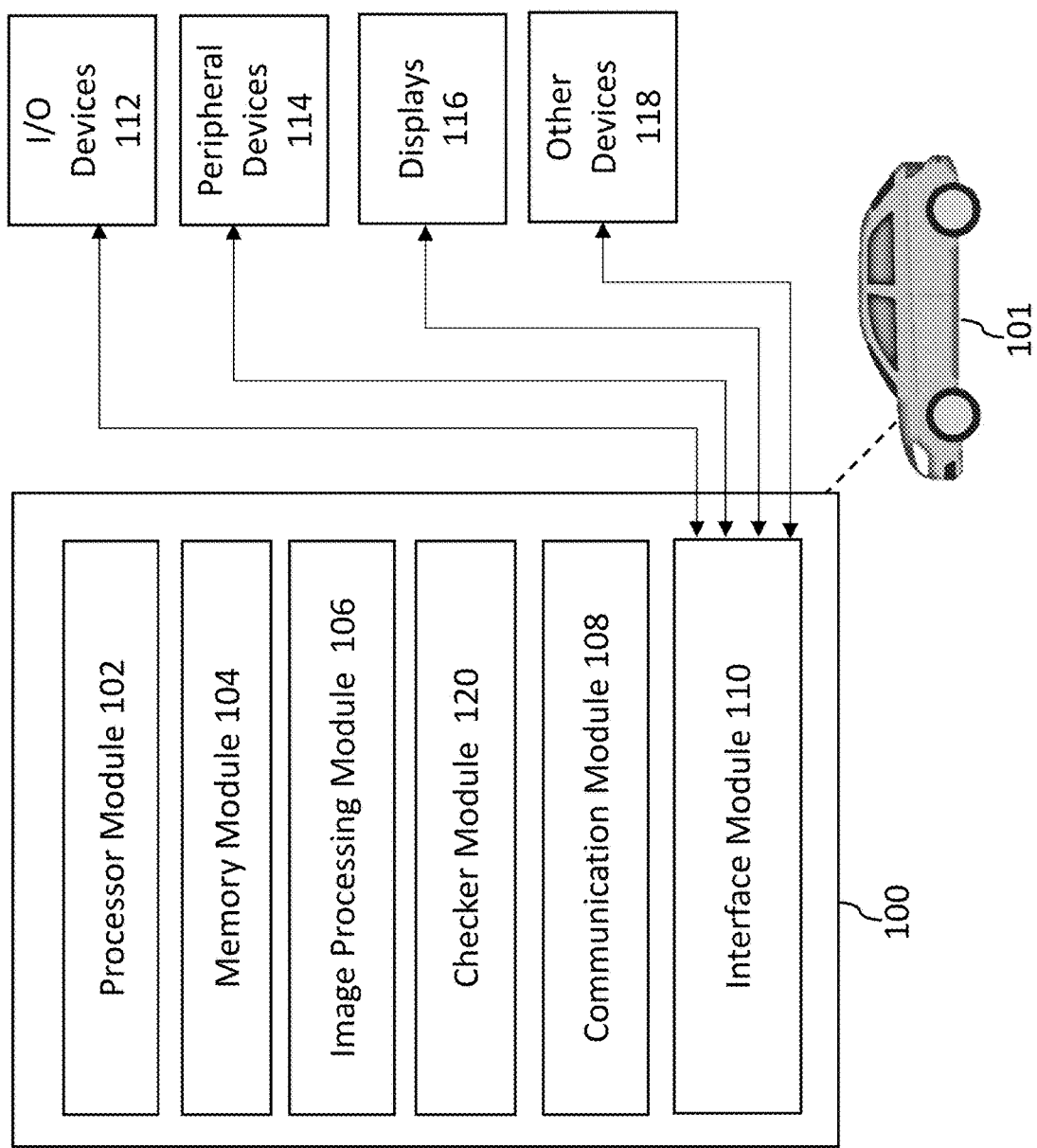
FIG. 1 is a block diagram of an example system for bounding box checker for object detection marking in one embodiment.

FIG. 1 is a block diagram of an example system for bounding box checker for object detection marking in one embodiment. System 100 can be implemented in a vehicle 101. The vehicle 101 can be a vehicle that can be operated by an operator, an autonomous vehicle, or an autonomous vehicle with an option to be operated by an operator. In one embodiment, system 100 can be an automotive instrumentation system. System 100 can be a system on a chip (SoC), where an SoC can be an integrated circuit that integrates various computing and electronic components or modules on a single chip. Components that can be integrated on a single chip to produce an SoC can include, but not limited to, a central processing unit (CPU), processor cores, microcontrollers, microprocessors, peripherals (e.g., graphics processing unit (GPU), Wi-Fi, modems), input/output (I/O) ports, graphics and memory interfaces, and secondary storage, radio modems, functional circuit blocks for processing digital, analog, mixed-signal, radio frequency signals, etc. In an aspect, SoCs separate components based on function and connects them through a central interfacing circuit board, which is different from motherboard-based architectures that house and connects detachable or replaceable components.

In the example shown in FIG. 1, system 100 can include a processor module 102, a memory module 104, an image processing module 106, a communication module 108, and an interface module 110. The components of system 100 shown in FIG. 1 is one example embodiment, and system 100 can include components or modules that may not be shown in the example in FIG. 1. For example, in one or more embodiments, system 100 can include timing sources (e.g., crystal oscillators and phase-locked loops), SoC peripherals (e.g., counter-timers, real-time timers and power-on reset generators), voltage regulators, power management circuits, etc.

Processor module 102 can be a processing module including at least one of a central processing unit (CPU), one or more processor cores, a microcontroller, a microprocessor, one or more digital signal processor (DSP) cores, an application-specific instruction set processor (ASIP), and/or other types of processing elements. DSP cores within processor module 102 can perform signal processing operations for sensors, actuators, data collection, data analysis and multimedia processing.

Memory module 104 can be a memory module including memory devices and/or storage elements such as, for example, read-only memory (ROM), random-access memory (RAM) including static RAM (SRAM) and/or dynamic RAM (DRAM), electrically erasable programmable ROM (EEPROM), flash memory, registers, caches, and/or other types or memory or storage elements.

Image processing module 106 can include various hardware components specifically for processing image and/or video data, and image rendering. For example, image processing module 106 can include video codec processors, three-dimensional (3D) graphics processors, video signal processor, image renderer, machine learning components such as computer vision and deep learning accelerators, etc.

Communication module 108 can include, for example, inter-module communication systems that can allow data and instructions to be exchanged between different modules within an SoC (e.g., system 100). For example, communication module 108 can include a communication bus connecting processor module 102, memory module 104, image processing module 106, interface module 110, and other modules integrated in system 100 with one another. Various data bus architectures, or sparse intercommunication networks known as networks-on-chip (NoC), can be implemented in communication module 108. Communication module 108 can also include a communication bus that connects the different modules. In an aspect, communication module 108 can include direct memory access controllers that can route data directly between external interfaces among interface module 110 and memory module 104 while bypassing processor module 102 to increase data throughput of system 100.

Interface module 110 can include interfaces for various different communication protocols, such as, for example, camera serial interface (CSI), universal serial bus (USB), FireWire, Ethernet, universal synchronous and asynchronous receiver-transmitter (USART), Serial Peripheral Interface (SPI), High-Definition Multimedia (HDMI), Inter-Integrated Circuit (I2C), interfaces that support wireless communication protocols such as Wi-Fi, Bluetooth, near-field communication, etc. Interface module 110 can also include analog interfaces, such as analog-to-digital converters (ADC) and digital-to-analog converters (DAC), to interface with different types of sensors or actuators, including smart transducers.

System 100 can interface with various components in vehicle 101 via interface module 110. In the example shown in FIG. 1, system 100 can interface with I/O devices 112, peripheral devices 114, displays 116, and other devices 118 such as another SoC or microcontroller units. I/O devices 112 can include, for example, microphones, speakers, user input devices such as touch screens, keypads, tuners, etc. Peripheral devices 114 can include, for example, cameras, sensors, actuators, external storage device readers (e.g., secure digital (SD) card readers, micro-SD card readers, etc.), multimedia devices (e.g., CD player, DVD player, etc.). Displays 116 can include, for example, a liquid crystal display thin-film transistor (LCD-TFT) screen, a light-emitting diode (LED) screen, an organic light-emitting diode (OLED) screen, a touch screen display, and/or other types of display suitable for vehicles.

In one embodiment, system 100 can further include a checker module 120 connected to processor module 102, memory module 104, image processing module 106, communication module 108, and interface module 110. Checker module 120 can include one or more integrated circuits (IC), configured to check or evaluate outputs from image processing module 106. For example, checker module 120 can include a display output comparison IC configured to compare a calculated cyclic redundancy check (CRC) code of a specific display area (e.g., a rectangle at a specific location on a display) with an expected CRC code of the specific area, and generate a flag or interrupt when the comparison indicates a mismatch. In another example, checker module 120 can include a display output checker IC configured to check whether any pixel within a specific display area (e.g., a rectangle at a specific location on a display) is out of bounds of a predefined boundary on the display. The display output comparison IC and display output IC can be used for checking or evaluating whether telltales are being displayed in correct spots, or displayed correctly (e.g., check whether there are missing pixels) on displays 116.

To be described in more detail below, image processing module 106 can implement a processing pipeline that 1) receives an image from a camera (e.g., front camera, back camera, surrounding camera, or other types of cameras of a vehicle), 2) detects objects in the received image, 3) generates bounding boxes encompassing the detected objects, 4) blends the received image with the bounding boxes to generate a blended image, and 5) checks or evaluates whether the bounding boxes have errors or not (e.g., whether bounding boxes are encompassing the detected objects correctly). In one embodiment, checker module 120 can include a bounding box checker IC configured to perform the check of whether the bounding boxes are encompassing the detected objects correctly.

Figure 2A:
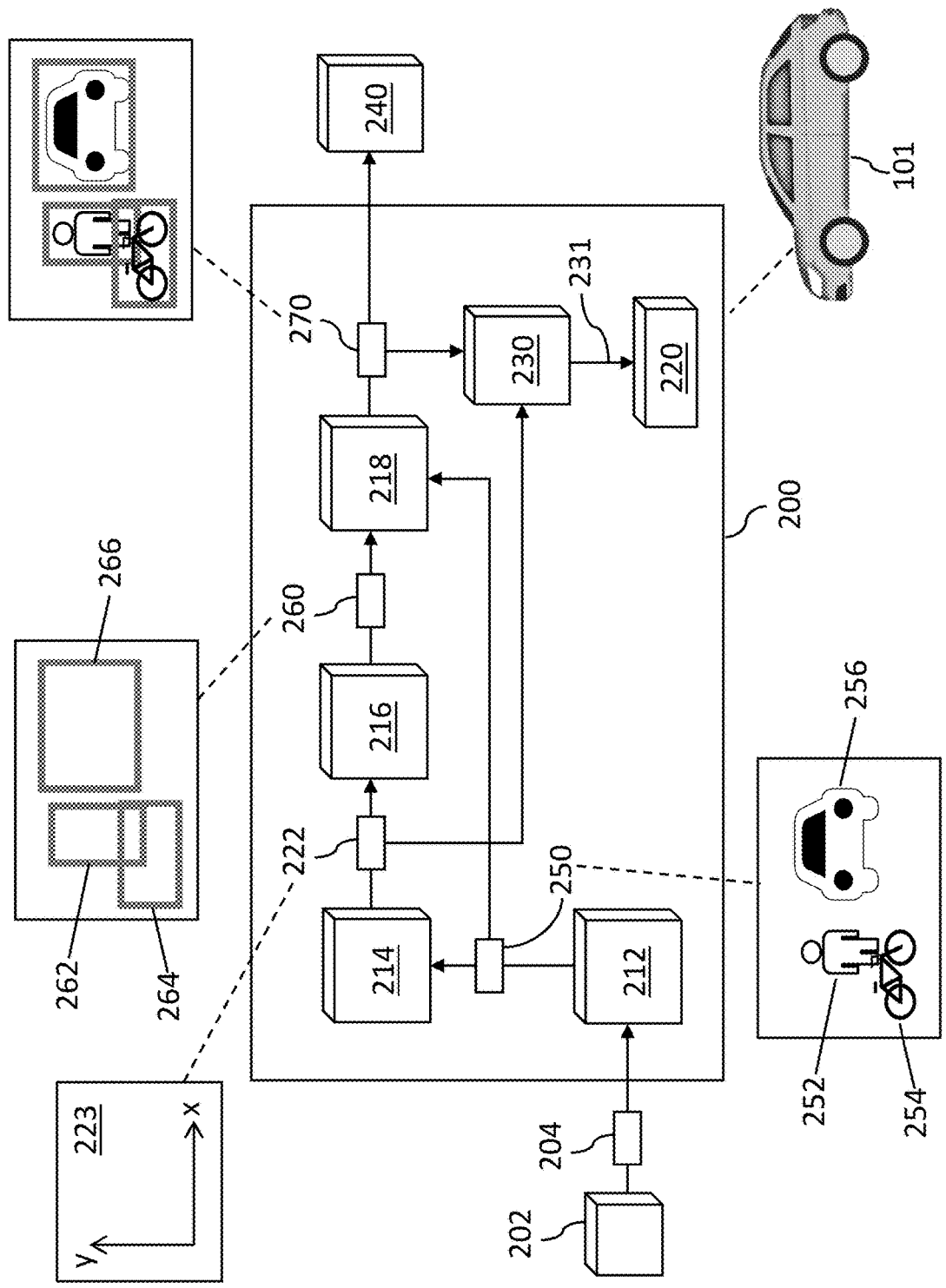
FIG. 2A is a block diagram illustrating details of a processing pipeline that can implement bounding box checker for object detection marking in one embodiment.
Figure 2B:
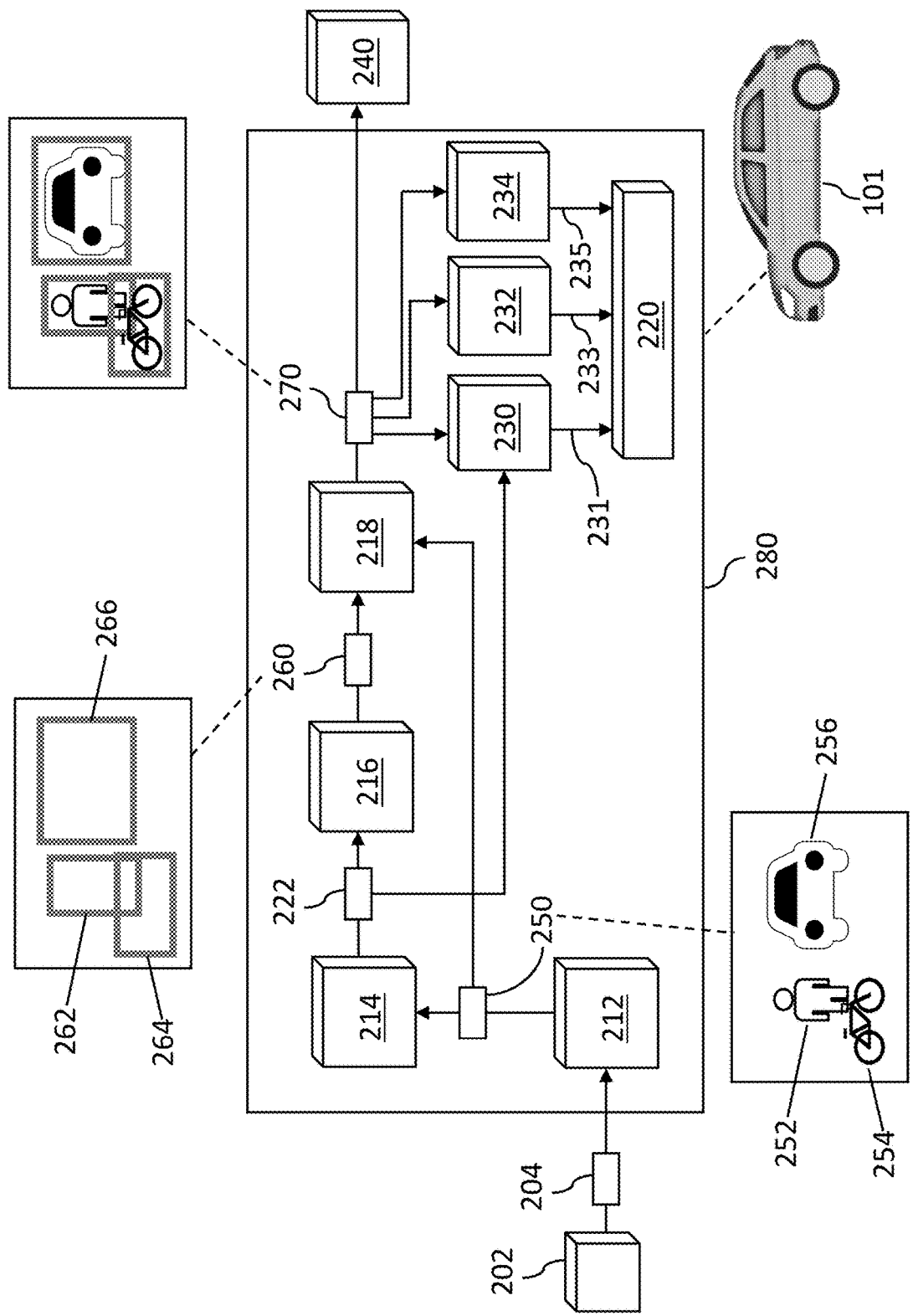
FIG. 2B is a block diagram illustrating details of another processing pipeline that can implement bounding box checker for object detection marking in one embodiment.

FIG. 2A and FIG. 2B are block diagrams illustrating details of processing pipelines that can implement bounding box checker for object detection marking in one embodiment. FIG. 2A shows a processing pipeline 200 that can be implemented by the system 100 shown in FIG. 1. FIG. 2B shows another processing pipeline 280 that can be implemented by the system 100 shown in FIG. 1.

In an example embodiment, processing pipeline 200 can start with an image sensor 202 sending raw image data 204 to an image signal processor (ISP) 212. Image sensor 202 can be a part of a digital camera among peripheral devices 114 shown in FIG. 1, and ISP 212 can be part of image processing module 106 shown in FIG. 1. Image sensor 202 can send raw image data 204 to ISP 212 via an interface among interface module 110. Image sensor 202 can be, for example, a camera, a radar sensor, or a sensor that can detect light or electromagnetic radiation and convert the detected light into signals (e.g., raw image data 204). Image sensor 202 can be an electronic imaging device, such as charge-coupled device (CCD). Raw image data 204 can be a camera raw image file including minimally processed data (sometimes not yet processed) from image sensor 202. In one example, raw image data 204 can be a frame among a plurality of frames of a video data stream being captured by image sensor 202. ISP 212 can be a digital signal processor (DSP) configured to perform various image processing techniques, such as image filtering (e.g., Bayer filter), noise reduction, image sharpening, pixel corrections, color interpolation, color space conversion, edge enhancement, image transformations, etc.

ISP 212 can process raw image data 204, such as applying one or more image processing techniques, to convert raw image data 204 into image data representing an image 250. Image 250 can be an image of an environment surrounding vehicle 101. In the example shown in FIG. 2A, image 250 can include an object 252 (e.g., a person), an object 254 (e.g., a bicycle), and an object 256 (e.g., a vehicle different from vehicle 101). ISP 212 can send image 250 to an object detection processor 214, and can send image 250 to an image blender 218.

Object detection processor 214 can be an image processor among a computer vision module that can be a part of image processing module 106 shown in FIG. 1. Object detection processor 214 can be configured to execute object detection algorithms, including machine learning and computer vision algorithms, to identify objects of interest in image 250. In one embodiment, objects of interest that can be identified by object detection processor 214 can include objects that may be moving to different positions between different frames of a video data stream, objects that may be within a threshold distance from image sensor 202, and/or objects that has a relatively high likelihood (e.g., high probability) of matching to object models learned by a machine learning or computer vision algorithm. In response to identifying objects of interest in image 250, object detection processor 214 can generate coordinates data 222, where coordinates data 222 include position data of the identified objects of interest.

In the example shown in FIG. 2A, objects 252, 254, 256 can be objects of interest identified by object detection processor 214. Coordinates data 222 can include a mapping between identifiers of objects 252, 254, 256, and position data of objects 252, 254, 256. In one embodiment, position data among coordinates data 222 can be coordinates of a two-dimensional (2D) space representing locations or positions of objects of interest in image 250. An example 2D space can be a 2D coordinate system 223, shown in FIG. 2A, having an x-axis and a y-axis orthogonal to one another. Object detection processor 214 can send coordinates data 222 to a bounding box generator 216 and to a bounding box checker 230.

Bounding box generator 216 can be an image processor among image processing module 106 shown in FIG. 1, and can be configured to generate a bounding box image 260. Bounding box image 260 can include a plurality of bounding boxes, such as bounding boxes 262, 264, 266. Bounding box generator 216 can generate bounding boxes 262, 264, 266 based on coordinates data 222 and/or predefined data stored in memory (e.g., memory module 104 shown in FIG. 1). The predefined data can indicate at least one attribute of bounding boxes, such as shape, size, margin (e.g., offset between boundaries of bounding boxes and detected object), position or location (e.g., coordinates of bounding box boundaries), etc. Bounding box generator 216 can send bounding box image 260 to image blender 218.

Image blender 218 can be an image processor among image processing module 106 shown in FIG. 1, and can be configured to combine or blend bounding box image 260 (received from bounding box generator 216) with image 250 (received from ISP 212) to generate a blended image 270. Blended image 270 can include the contents of image 250, such as objects 252, 254, 256, and bounding boxes in bounding box image 260, such as bounding boxes 262, 264, 266. Image blender 218 can output blended image 270 to a display 240 among displays 116 shown in FIG. 1, and can output blended image 270 to bounding box checker 230.

Bounding box checker 230 can be an integrated circuit among checker module 120 shown in FIG. 1. Bounding box checker 230 can include its own processing unit (e.g., hardware processor) and memory or storage elements (e.g., registers). Bounding box checker 230 can receive coordinates data 222 from object detection processor 214, and can receive blended image 270 from image blender 218. Bounding box checker 230 can check if there is a bounding box in blended image 270 at an expected position, and check if pixels representing the expected position has a correct bounding box color (e.g., pixel value). In one embodiment, to perform these checks, bounding box checker 230 can compare coordinates data 222 with coordinates that define boundaries of the bounding boxes, such as bounding boxes 262, 264, 266 in bounding box image 260, as described in more detail below. A result of the comparison performed by bounding box checker 230 can indicate whether bounding boxes in blended image 270 have errors or not. Errors of bounding boxes in blended image 270 can include, for example, incorrect size (e.g., too large, too small, too wide, too narrow, incorrect height or length or other dimensions, etc.), incorrect shape, incorrect positions or coordinates, incorrect color, etc.

In response to bounding boxes in blended image 270 having errors, bounding box checker 230 can send error data 231 to an error control module (ECM) 220. Error data 231 can include messages and data indicating a presence or an absence of bounding box errors in blended image 270 identified by bounding box checker 230. ECM 220 can be an integrated circuit configured to perform one or more actions in response to receiving error data 231. For example, ECM 220 can be configured to report a presence of bounding box errors indicated in error data 231 to a processor, such as a processor in processor module 102 shown in FIG. 1. In one embodiment, the processing receiving the report from ECM 220 can trigger components of image processing module 106 to generate and output an alert on display 240 to notify an operator (e.g., driver) of vehicle 101 that blended image 270 being displayed on display 240 may include errors.

In an aspect, errors of bounding boxes in blended image 270 can be caused by memory fault, such as when there are errors in register files among memory module 104. For example, a register file storing a predefined shape of bounding boxes can store an erroneous value, which can cause bounding box generator 216 to blend one or more bounding boxes having wrong shapes. Other hardware related errors, such as memory corruption or hardware degradation of components in system 100 over time, can also cause bounding box generator 216 to render erroneous one or more bounding boxes. In one embodiment, ECM 220 can report bounding box errors to processor module 102, and the processor module 102 can interpret the reported bounding box error as a potential memory fault. Processor module 102 may analyze the registers among system 100 storing predefined bounding box data (e.g., color, size, shape, etc.) to determine whether storage location of these predefined bounding box data needs to be changed.

In one embodiment, bounding box checker 230 can be implemented with other checker integrated circuits among checker module 120 shown in FIG. 1. In an example shown in FIG. 2B, bounding box checker 230 can be implemented alongside a display output comparison IC 232 and a display output checker IC 234. Display output comparison IC 232 can be configured to compare a calculated cyclic redundancy check (CRC) code of a specific display area with an expected CRC code of the specific display area. Display output checker IC 234 can be configured to check whether any pixel within a specific display area is out of bounds of a predefined boundary on the display. Display output comparison IC 232 and display output checker IC 234 can be used for checking whether telltales are being displayed in correct spots, or displayed correctly (e.g., check whether there are missing pixels) on displays 116. If there are any errors associated with telltales being displayed on display 240, display output comparison IC 232 and display output checker IC 234 can send their respective error data 233, 235 to ECM 220. The functions of bounding box checker 230, display output comparison IC 232, and display output checker IC 234 are independent from one another. Bounding box checker 230 is configured to check for bounding box errors in a blended images that include object detection markings such as bounding boxes (e.g., blended image 270), whereas display output comparison IC 232 and display output checker IC 234 are for checking for errors in predefined display areas of a display screen instead of blended images.

Figure 3:
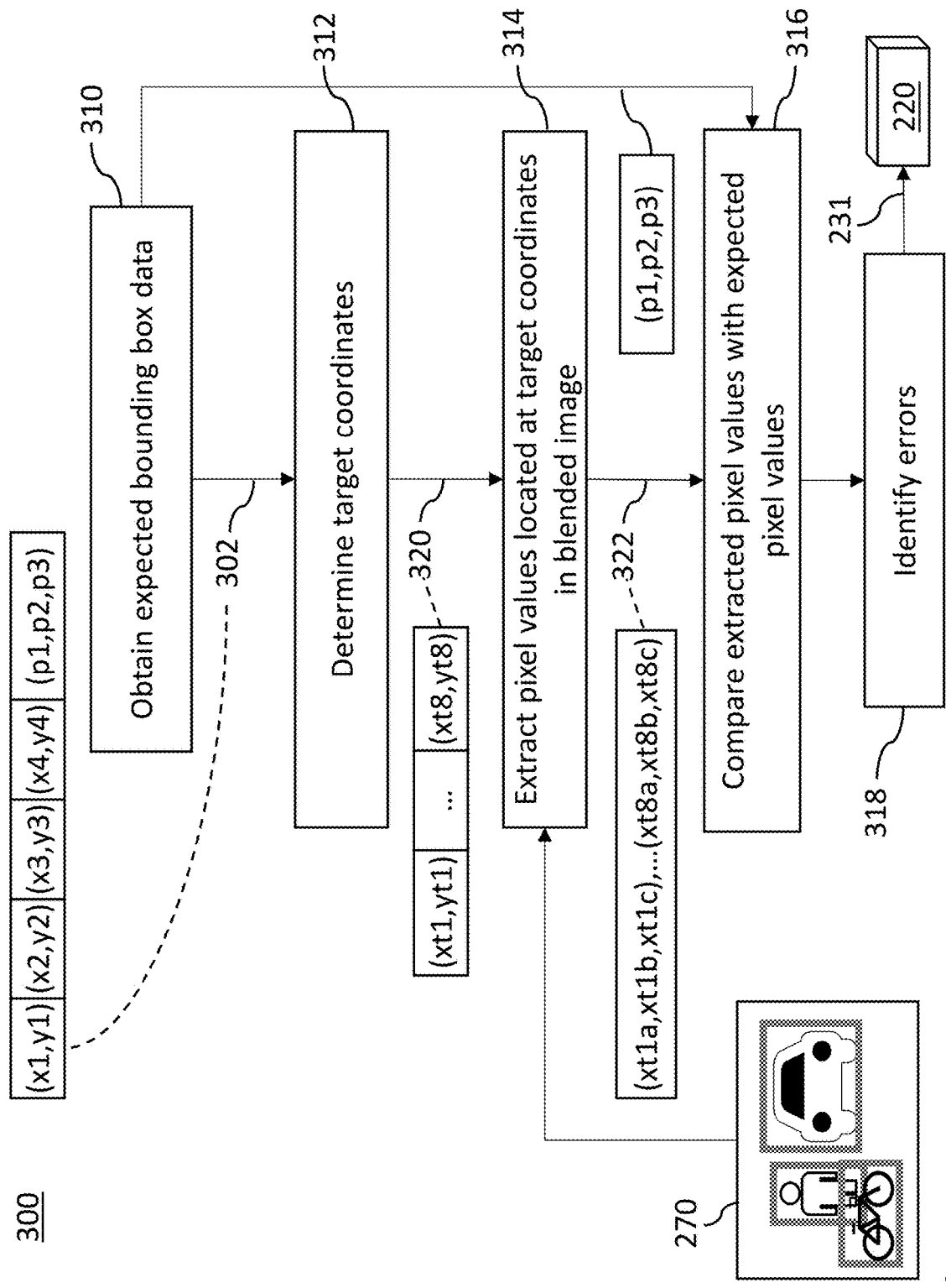
FIG. 3 is a block diagram illustrating a process that can be performed by a bounding box checker in one embodiment.

FIG. 3 is a block diagram illustrating a process 300 that can be performed by bounding box checker 230, shown in FIG. 2A and FIG. 2B, in one embodiment. Process 300 can begin at block 310, where bounding box checker 230 can obtain expected bounding box data 302. Expected bounding box data 302 can include a set of corner coordinates and an expected pixel value representing one or more expected bounding boxes. The set of corner coordinates can include N coordinates representing an N-sided shape bounding box that has N corners. In the example shown in FIG. 3, expected bounding box data 302 can include four corner coordinates (x1, y1), (x2, y2), (x3, y3), (x4, y4) of a rectangle. The corner coordinates can be determined based on coordinates data of objects indicated by coordinates data 222, and based on predefined bounding box data such as predefined offset (e.g., offset between bounding box boundaries and object boundaries), predefined shape, predefined size, predefined color, etc., of bounding boxes. The expected pixel value among expected bounding box data 302 can be a value, in a specific image format, representing a predefined bounding box color. The image format of the expected pixel value can be, for example, RGB, YUV, etc. In the example shown in FIG. 3, the expected pixel value among expected bounding box data 302 can be represented as a predefined value (p1, p2, p3).

In one embodiment, bounding box checker 230 can be configured to determine the set of corner coordinates based on coordinates data 222. Bounding box checker 230 can store the set of corner coordinates in local memory, such as register files, of bounding box checker 230. Further, expected pixel value (p1, p2, p3) can be stored in local memory of bounding box checker 230 as well. At block 310, in response to the set of corner coordinates and the expected pixel value being stored in local memory, bounding box checker 230 can retrieve expected bounding box data 302 from the local memory.

In another embodiment, an external processor (e.g., outside of or external to bounding box checker 230) among processor module 102 (FIG. 1) can determine the set of corner coordinates based on coordinates data 222. The external processor can store the set of corner coordinates in an external memory (e.g., outside of or external to bounding box checker 230), such as RAM, among memory module 104 of FIG. 1. Further, predefined value (px1, px2, px3) can also be stored in the external memory. At block 310, in response to the set of corner coordinates and the expected pixel value being stored in the external memory, bounding box checker 230 can retrieve expected bounding box data 302 from the external memory.

In one embodiment, using an external processor to determine the set of corner coordinates and an external memory to store the set of corner coordinates may allow bounding box checker 230 to check or evaluate relatively more bounding boxes in blended image 270. Using bounding box checker 230 to determine the set of corner coordinates and local memory to store the set of corner coordinates may limit the number of bounding boxes that can be checked by bounding box checker 230 due to limited amount of local memory integrated in bounding box checker 230. However, local determination and storage of the set of corner coordinates may result in relatively faster processing time when compared to using the external processor and memory. In one embodiment, system 100 shown in FIG. 1 can use a processor and a memory external to bounding box checker 230 to determine and store expected bounding box data 302 in response to a number of bounding boxes in blended image 270 being greater than a bounding box number threshold. The bounding box number threshold can be a predefined threshold stored in a register of bounding box checker 230 and/or memory module 104. Bounding box checker 230 can use its local processor and memory in response to the number of bounding boxes in blended image 270 being less than the bounding box number threshold.

Process 300 can proceed from block 310 to block 312. At block 312, bounding box checker 230 can determine or identify a set of target coordinates 320. Target coordinates 320 can be a set of coordinates located at a predefined offset from the corner coordinates among expected bounding box data 302. In one embodiment, the number of coordinates among target coordinates 320 can be predefined, such as thirty-two coordinates, where each corner coordinate among expected bounding box data 302 corresponds to a subset of eight target coordinates. For example, as shown in FIG. 3, a subset of target coordinates 320 corresponding to corner coordinates (x1, y1) can be represented as coordinates (xt1, yt1), . . . , (xt8, yt8). In one embodiment, a thickness (e.g., number of pixels) of bounding boxes (e.g., bounding boxes to be generated by bounding box generator 216 in FIG. 2A and FIG. 2B) can be based on the predefined number of coordinates among target coordinates 320 and an image or color format of the bounding boxes. The locations of target coordinates 320 will be described in more detail below.

Process 300 can proceed from block 312 to block 314. At block 314, bounding box checker 230 can receive blended image 270 from image blender 218 (FIG. 2A and FIG. 2B), and extract pixel values 322 at target coordinates 320 from blended image 270. For example, pixel values 322 extracted by bounding box checker 230 can include eight pixel values (xt1a, xt1b, xt1c), . . . , (xt8a, xt8b, x8c), located at (xt1, xt2), . . . , (xt8, yt8) in blended image 270, respectively.

Process 300 can proceed from block 314 to block 316. At block 316, bounding box checker 230 can compare each one of the extracted pixel values (xt1a, xt1b, xt1c), . . . , (xt8a, xt8b, xt8c) with expected pixel value (p1, p2, p3). Then, process 300 can proceed from block 316 to block 318, where bounding box checker 230 can analyze a result of the comparison in block 316 to identify errors relating to bounding boxes in blended image 270. In response to a match between each one of the extracted pixel values (xt1a, xt1b, xt1c), . . . , (xt8a, xt8b, xt8c) and expected pixel value (p1, p2, p3), bounding box checker 230 can determine that there is no error relating to bounding boxes (e.g., bounding boxes 262, 264, 266) in blended image 270. In response to a mismatch between at least one of the extracted pixel values (xt1a, xt1b, xt1c), . . . , (xt8a, xt8b, xt8c) and expected pixel value (p1, p2, p3), bounding box checker 230 can determine that there is error relating to bounding boxes (e.g., bounding boxes 262, 264, 266) in blended image 270. In response to determining that there is error relating to bounding boxes in blended image 270, bounding box checker 230 can generate error data 231 and send error data 231 to ECM 220. Error data 231 can indicate a presence or an absence of error relating to bounding boxes in blended image 270, such as one or more of missing bounding box, incorrect color, incorrect position, incorrect size, etc., as explained in more detail below The process 300 can be performed for one or more objects and/or bounding boxes in one blended image 270. In one embodiment, for M objects in image 250, there are M expected bounding boxes. Expected bounding box data 302 can include M sets of corner coordinates and each set of corner coordinates include N coordinates (for N-sided side). Thus, expected bounding box data 302 can include N×M corner coordinates. Each corner coordinate can correspond to K target coordinates. Thus, target coordinates 320 can include K x N×M coordinates.

Figure 4A:
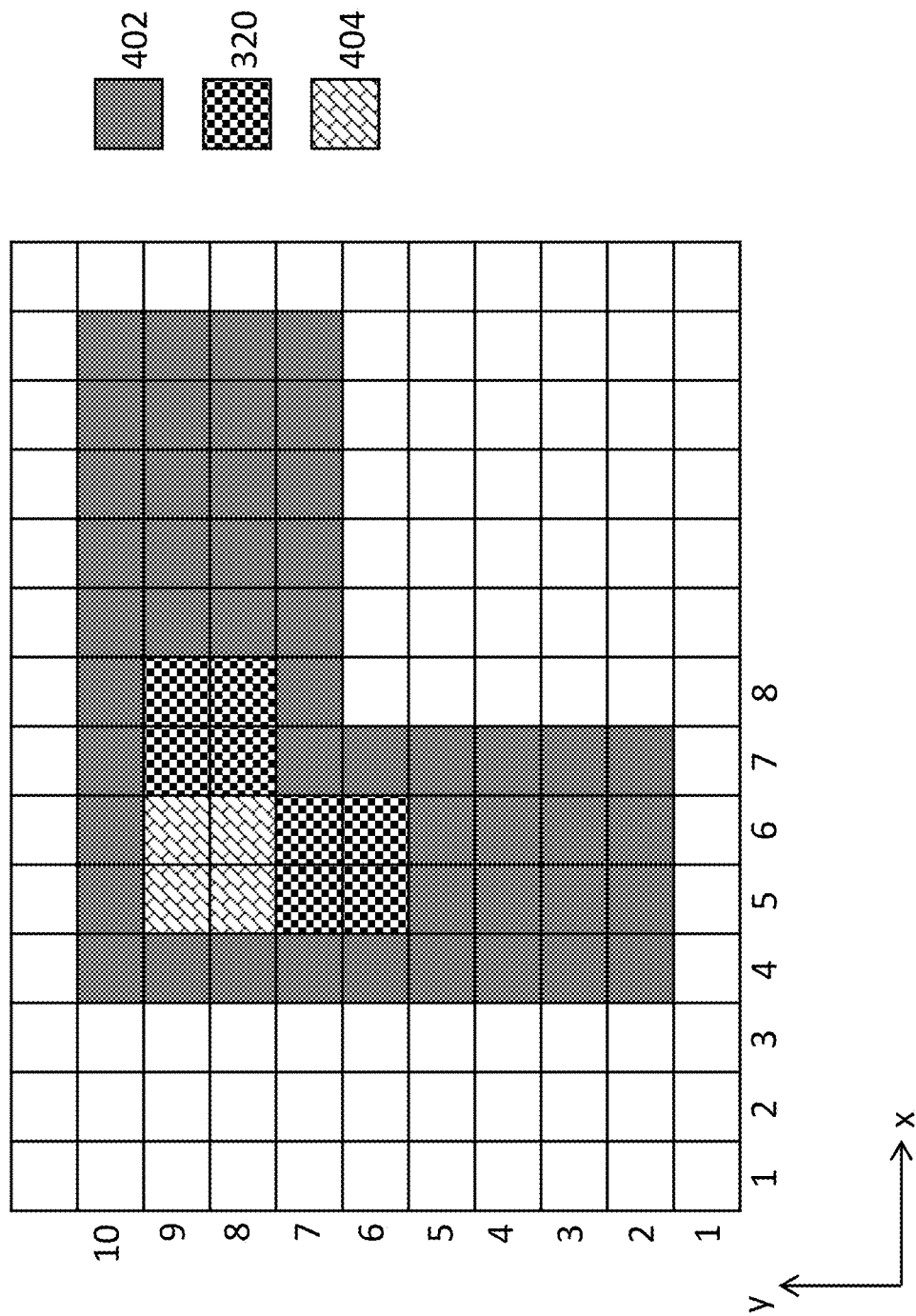
FIG. 4A is a diagram illustrating example locations of target coordinates that can be used by a bounding box checker in one embodiment.

FIG. 4A is a diagram illustrating example locations of target coordinates that can be used by a bounding box checker in one embodiment. In an example shown in FIG. 4A, pixels of a portion of an expected bounding box 402 represented by expected bounding box data 302 are shown. For example, coordinate (4, 10) shown in FIG. 4A can be one of the corner coordinates among expected bounding box data 302, and a pixel value representing or encoding a color of expected bounding box 402 is the expected pixel value in expected bounding box data 302. A thickness of the expected bounding box shown in FIG. 4A is four pixels (e.g., ranging from x=4 to x=7, and from y=7 to y=10).

Bounding box checker 230 shown in FIG. 2A and FIG. 2B can be configured to identify locations of target coordinates (see FIG. 3) based on a location of corner coordinate (4, 10). In one embodiment, bounding box checker 230 can identify a group of center coordinates 404 corresponding to corner coordinate (4, 10). In the example shown in FIG. 4A, the center coordinates are (5, 8), (6, 8), (5, 9), and (6, 9). Center coordinates 404 can include coordinates offset from corner coordinate (4, 10) by an offset ranging from x=1 to x=2, and from y=1 to y=2. In other words, center coordinates 404 are located at (c1x+1:2, c1y+1:2), where (c1x, c1y) is a corner coordinate. Bounding box checker 230 can identify locations of target coordinates 320 based on center coordinates 404. For example, bounding box checker 230 can determine or identify a first group of target coordinates 320 adjacent to center coordinates 404 in the x-direction, and determine or identify a second group of target coordinates 320 adjacent to center coordinates 404 in the y-direction. In the example shown in FIG. 4A, the first group of target coordinates 320 can be (7, 8), (8, 8), (7, 9), and (8, 9), and the second group of target coordinates 320 can be (5, 6), (6, 6), (5, 7), and (6, 7).

In one embodiment, in response to the number of target coordinates 320 being eight, a thickness of expected bounding box 402 can be set to greater than or equal to four pixels. In an aspect, the YUV 422/420 color format shares U and V values between two adjacent pixels (or four pixels for YUV420, two horizontally and two vertically) to cause color blending (e.g., color change). Thus, if the thickness of expected bounding box 402 is greater than or equal to four pixels, the center two pixels shall remain the same (e.g., no color changes), or shall not be blended with the same color. The locations of the center two pixels having the same color can become a candidate for target coordinates 320 since the expected pixel value specified by expected bounding box data 302 can remain the same (e.g., only having one expected pixel value for comparison at block 316 of FIG. 3).

For example, if expected bounding box 402 in FIG. 4A uses YUV420 format, pixels located at (3,6) and (4,6) may share the same color value but different luminance value for blending purposes (e.g., blending expected bounding box 402 with surrounding pixels). Pixels located at (7,6) and (8,6) may also share the same color value but different luminance value for blending purposes. However, pixels located at (5,6) and (6,6) may share the same color value and the same luminance value. Therefore, pixels located at (5,6) and (6,6) can be represented by one expected pixel value in expected bounding box data 302. Note that the choice of using the coordinates of center two pixels among a thickness that is greater than or equal to four can be applicable to other color formats as well. For example, even if the RGB color format share same color values across the four (or greater) pixels, the center two pixels can still share the same pixel value and their coordinates can be set as target coordinates 320 in the same manner.

Figure 4B:
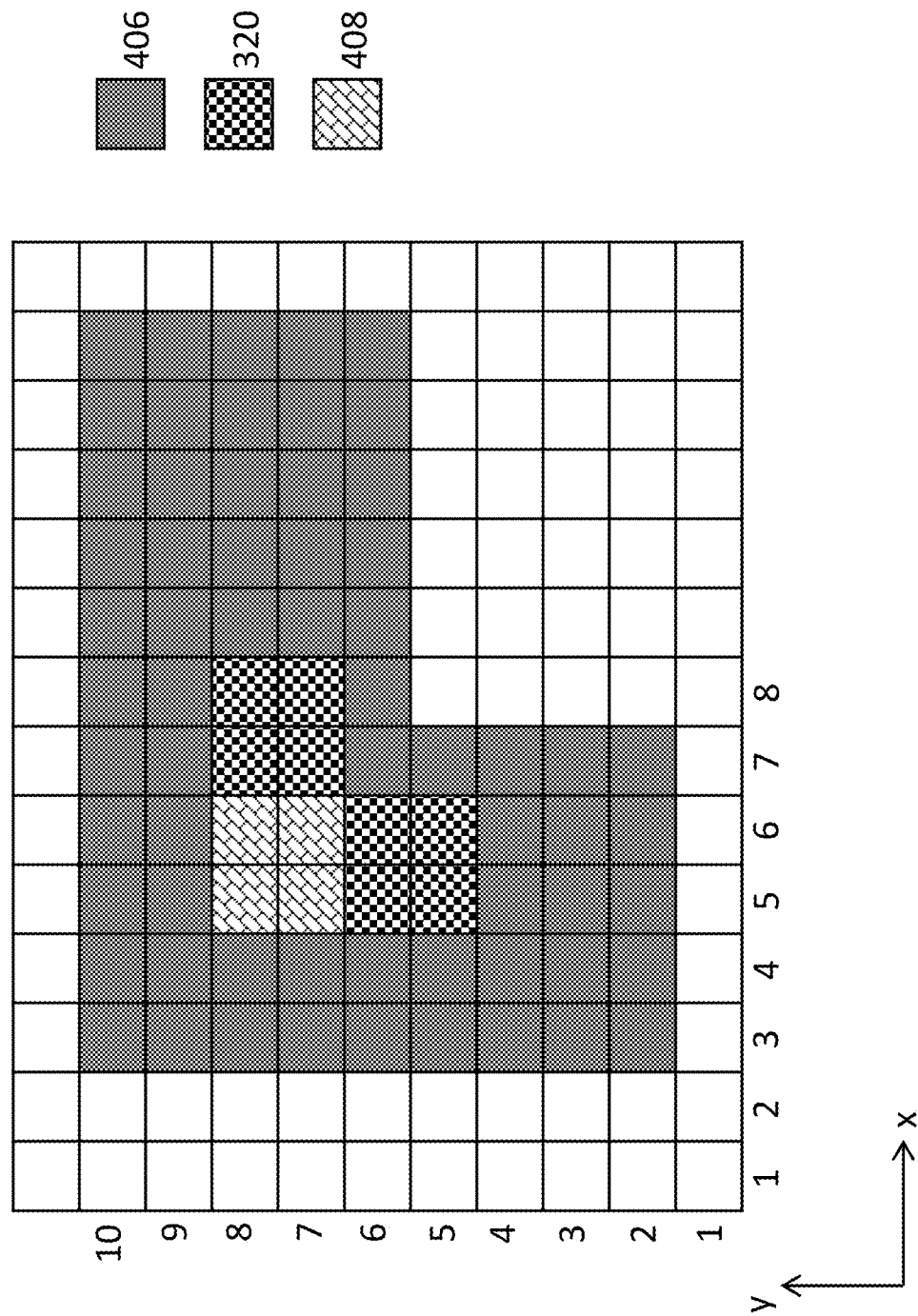
FIG. 4B is a diagram illustrating another example locations of target coordinates that can be used by a bounding box checker in one embodiment.

FIG. 4B is a diagram illustrating another example locations of target coordinates that can be used by a bounding box checker in one embodiment. In an example shown in FIG. 4B, pixels of a portion of an expected bounding box 406 represented by expected bounding box data 302 are shown. For example, coordinate (3, 10) shown in FIG. 4A can be one of the corner coordinates among expected bounding box data 302, and a pixel value representing or encoding a color of expected bounding box 406 is the expected pixel value in expected bounding box data 302. A thickness of the expected bounding box shown in FIG. 4A is five pixels (e.g., ranging from x=3 to x=7, and from y=6 to y=10).

Bounding box checker 230 shown in FIG. 2A and FIG. 2B can be configured to identify locations of target coordinates (see FIG. 3) based on a location of corner coordinate (3, 10) shown in FIG. 4B. In one embodiment, bounding box checker 230 can identify a group of center coordinates 408 corresponding to corner coordinate (3, 10). In the example shown in FIG. 4B, center coordinates are (5, 7), (6, 7), (5, 8), and (6, 8). Center coordinates 408 can include coordinates offset from corner coordinate (3, 10) by an offset ranging from x=2 to x=3, and from y=2 to y=3. In other words, center coordinates 408 are located at (c2x+2:3, c2y+2:3), where (c2x, c2y) is a corner coordinate. Bounding box checker 230 can identify locations of target coordinates 320 based on center coordinates 408. For example, bounding box checker 230 can determine or identify a first group of target coordinates 320 adjacent to center coordinates 408 in the x-direction, and determine or identify a second group of target coordinates 320 adjacent to center coordinates 408 in the y-direction. In the example shown in FIG. 4B, the first group of target coordinates 320 can be (7, 7), (8, 7), (7, 8), and (8, 8), and the second group of target coordinates 320 can be (5, 5), (6, 5), (5, 6), and (6, 6).

Figure 5:
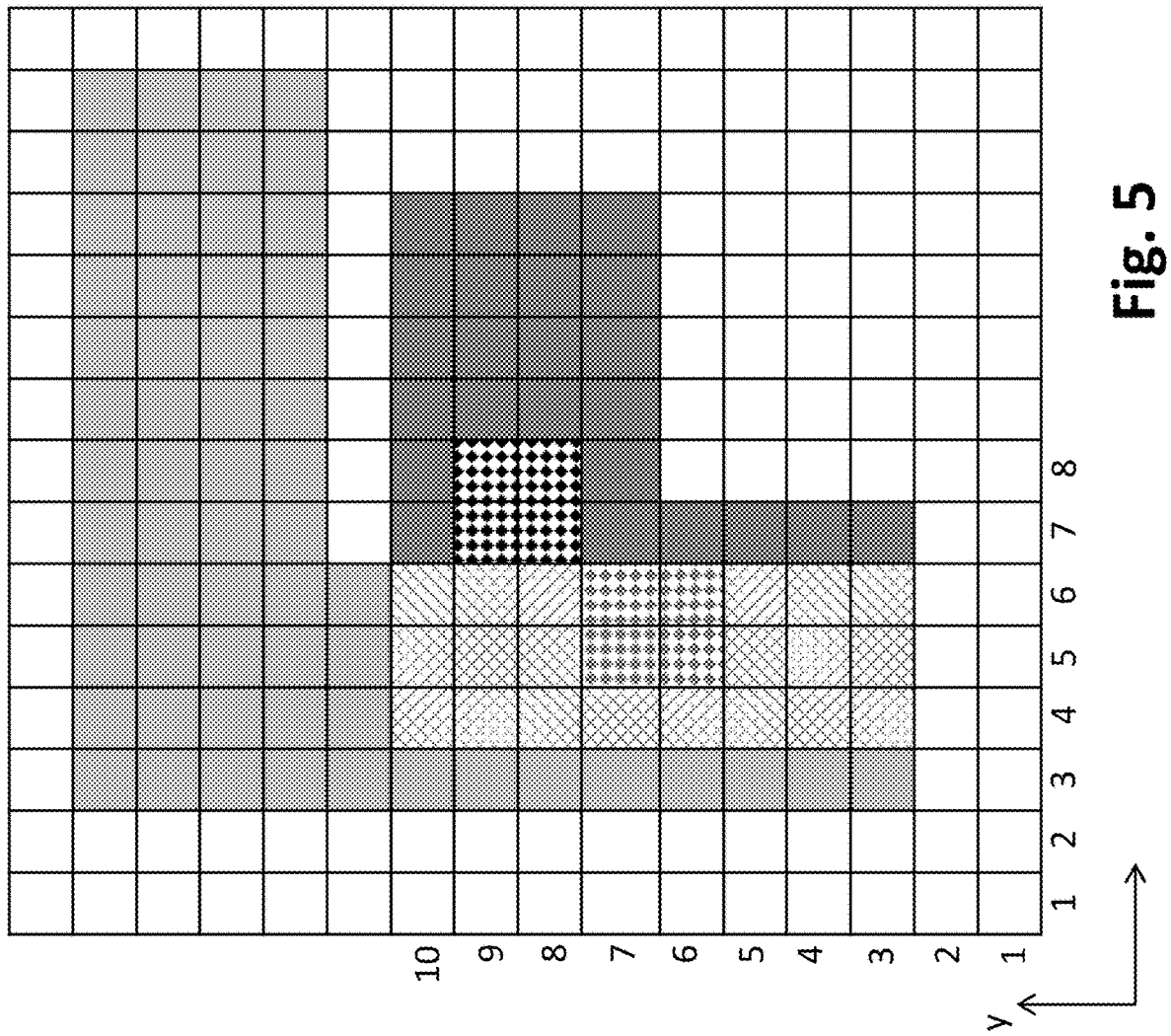
FIG. 5 is a diagram illustrating an example application of a bounding box checker in one embodiment.

FIG. 5 is a diagram illustrating an example application of a bounding box checker in one embodiment. In an example shown in FIG. 5, expected bounding box 402 shown in FIG. 4A is being used by bounding box checker 230 to check or evaluate whether a bounding box 502 has errors. Bounding box 502 (e.g., an actual generated bounding box) can be a bounding box in blended image 270 (see FIG. 1 to FIG. 3). The expected bounding box 402 and the actual generated bounding box 502 can be evaluated on the same plane (e.g., x-y plane). The evaluation of the expected bounding box 402 and the actual generated bounding box 502 on the same plane may result in overlapping pixels, such as overlapping pixels 504 in FIG. 5, or may result in no overlapping pixels between expected bounding box 402 and the actual generated bounding box 502. In response to the evaluation, bounding box checker 230 can compare expected pixel values (e.g., indicated in expected bounding box data 302 of FIG. 3) of expected bounding box 402 with pixel values of actual generated bounding box 502 at target coordinates 320. In the example shown in FIG. 5, target coordinates 320 are located at target coordinates (7, 8), (8, 8), (7, 9) , and (8, 9) that includes pixels 508, and target coordinates (5, 6), (6, 6), (5, 7), and (6, 7) that includes pixels 506.

In one embodiment, a comparison of overlapping pixels 504 with other pixels at target coordinates (5, 6), (6, 6), (5, 7), and (6, 7), such as pixels 506, can indicate whether bounding box 502 is rendered to a correct color or not. If expected bounding box 402 and bounding box 502 are rendered to the same color, a comparison of the overlapping pixels 504 at target coordinates (5, 6), (6, 6), (5, 7), and (6, 7) will indicate a match. If expected bounding box 402 and bounding box 502 are rendered to different colors, a comparison of the overlapping pixels 504 at target coordinates (5, 6), (6, 6), (5, 7), and (6, 7) will indicate a mismatch. Therefore, a match of pixel values between the overlapping pixels 504 can indicate that bounding box 502 is rendered to a correct color, and a mismatch of pixel values between the overlapping pixels 504 can indicate that bounding box 502 is rendered to an incorrect color.

A comparison of pixels, including pixels 508, at target coordinates (7, 8), (8, 8), (7, 9), and (8, 9) can indicate whether bounding box 502 is rendered at a correct location, a correct shape, or to a correct size. Note that pixels 508 at target coordinates (7, 8), (8, 8), (7, 9), and (8, 9) are not overlapping with bounding box 502. In response to pixels 508 at target coordinates (7, 8), (8, 8), (7, 9), and (8, 9) not overlapping with bounding box 502, a comparison of pixels at target coordinates (7, 8), (8, 8), (7, 9), and (8, 9) will indicate a mismatch. The mismatch of pixel values at target coordinates (7, 8), (8, 8), (7, 9), and (8, 9) can indicate that bounding box 502 is rendered to an incorrect location, shape, and/or size.

At least one compared pixel having error (e.g., incorrect color, location shape, size) is sufficient to deem that bounding box 502 has errors. For example, even if bounding box 502 is rendered to a correct color at target coordinates (5, 6), (6, 6), (5, 7), and (6, 7), the incorrect location indicated by a mismatch at target coordinates (7, 8), (8, 8), (7, 9), and (8, 9) can indicate an error. Further, if bounding box 502 has four corners (e.g., FIG. 5 comparison is for one corner), then a comparison of all four corners can ensure whether bounding box 502 has errors or not. For example, if comparisons of target coordinates 320 at three corners indicate a match for all, but a fourth corner has one mismatch, then bounding box 502 is deemed as having errors.

Figure 6A:
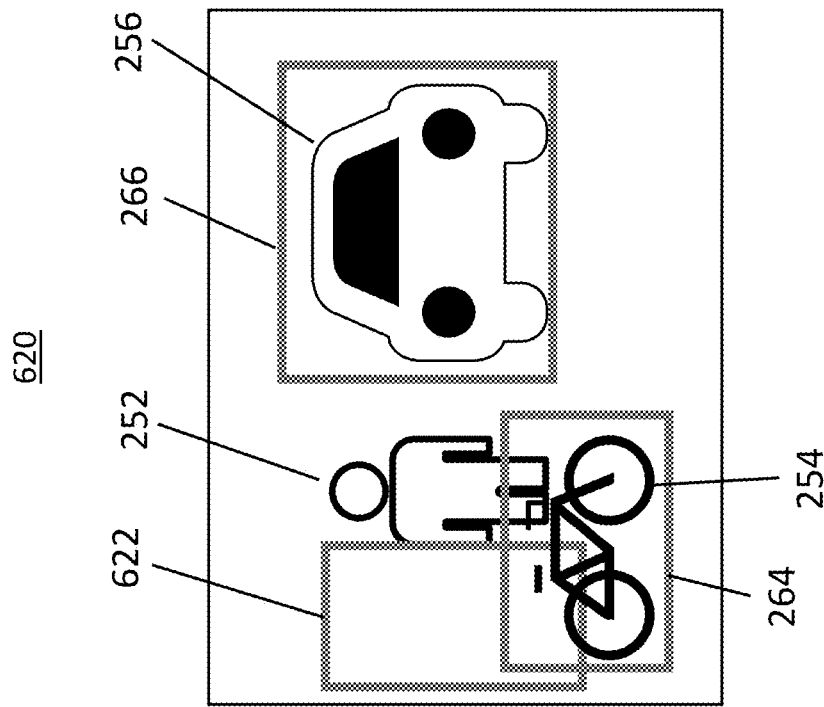
FIG. 6A is a diagram illustrating an example blended image including errors that can be identified by a bounding box checker in one embodiment.

FIG. 6A to FIG. 6F are diagrams illustrating example blended images including errors that can be identified by bounding box checker 230 (see FIG. 2A and FIG. 2B) in one embodiment. In FIG. 6A, a blended image 610 that can be outputted by image blender 218 includes objects 252, 254, 256 and bounding boxes 264, 266. Bounding boxes 264, 266 encompass objects 254, 256 correctly, but no bounding box is encompassing object 252. Bounding box checker 230 can identify the missing bounding box for object 252 using the process and comparisons described with respect to FIG. 3 to FIG. 5.

Figure 6B:
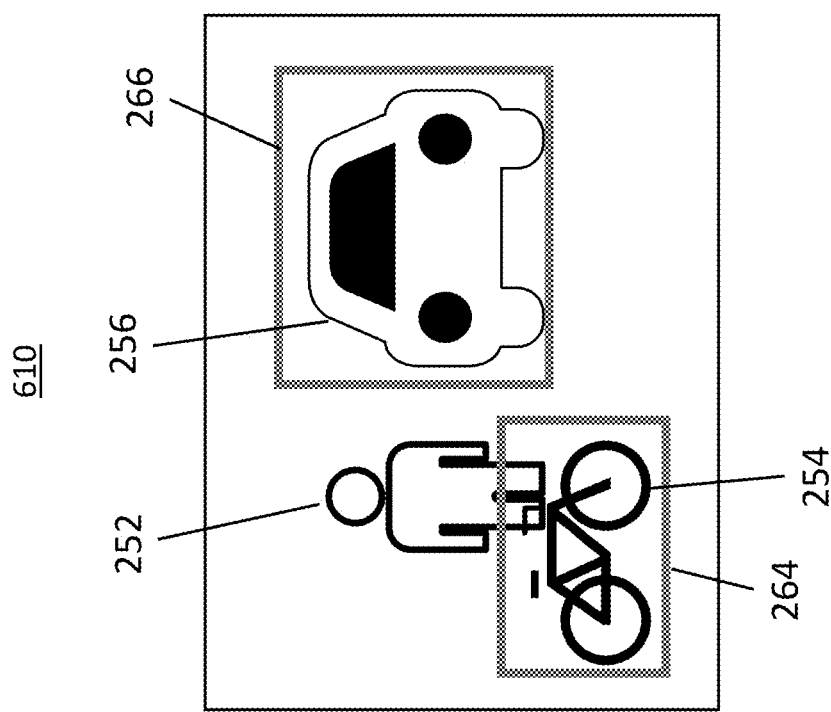
FIG. 6B is a diagram illustrating another example blended image including errors that can be identified by a bounding box checker in one embodiment.

In FIG. 6B, a blended image 620 that can be outputted by image blender 218 includes objects 252, 254, 256 and bounding boxes 622, 264, 266. Bounding boxes 264, 266 encompass objects 254, 256 correctly, but bounding box 622 fails to encompass object 252 due to bounding box 622 being rendered (e.g., by bounding box generator 216) at a wrong position or location. Bounding box checker 230 can identify the erroneous position of bounding box 622 using the process and comparisons described with respect to FIG. 3 to FIG. 5.

Figure 6D:
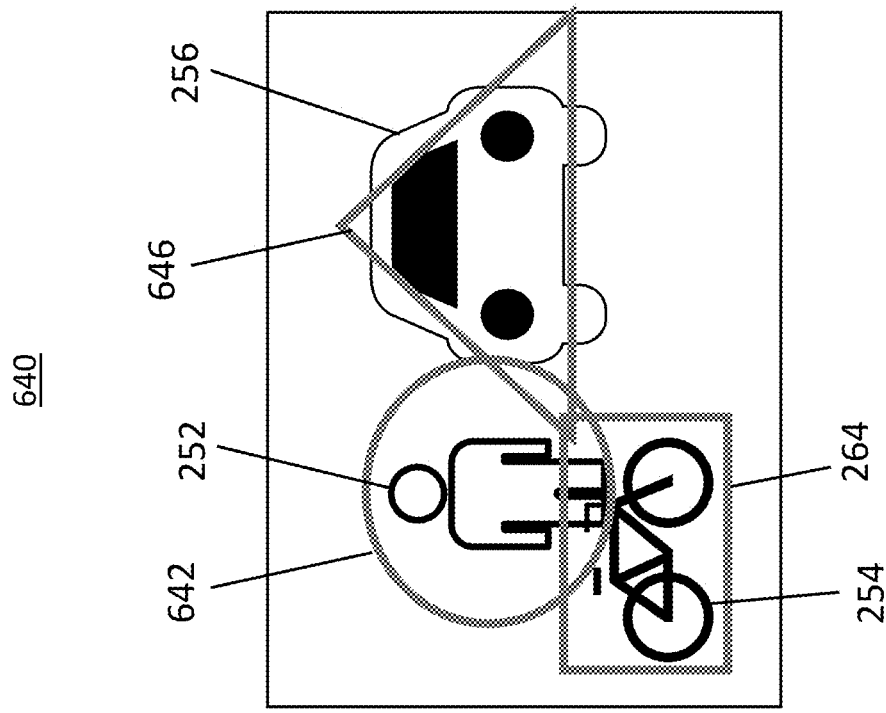
FIG. 6D is a diagram illustrating another example blended image including errors that can be identified by a bounding box checker in one embodiment.
Figure 6C:
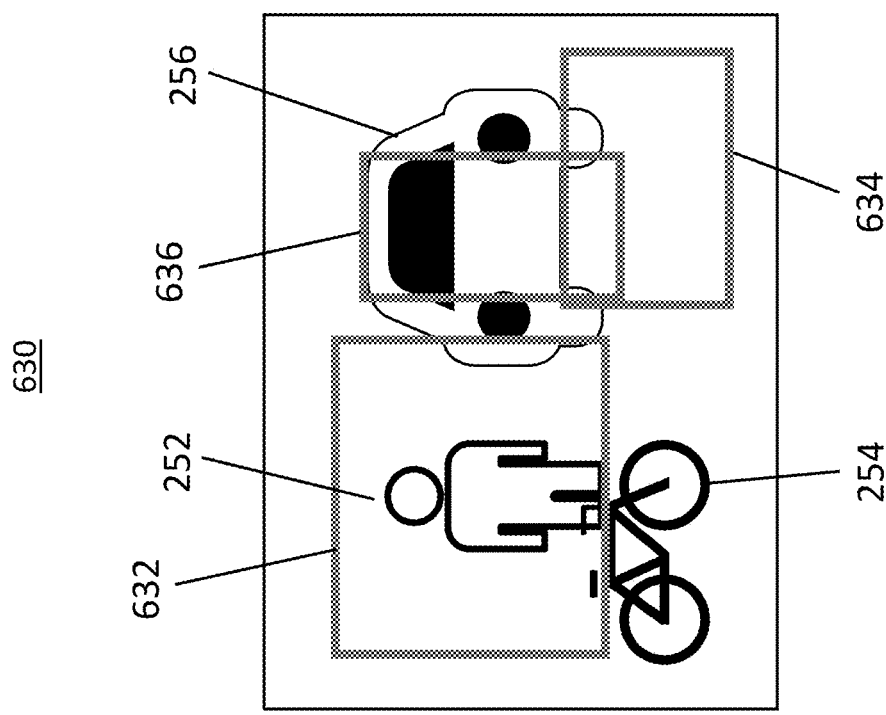
FIG. 6C is a diagram illustrating another example blended image including errors that can be identified by a bounding box checker in one embodiment.

In FIG. 6C, a blended image 630 that can be outputted by image blender 218 includes objects 252, 254, 256 and bounding boxes 632, 634, 636. In blended image 630, bounding boxes 632, 634, 636 are flipped horizontally (e.g., over the y-axis of coordinate system 223 in FIG. 2A). For example, bounding box 632 is supposed to be encompassing object 256, bounding box 634 is supposed to be encompassing object 254, and bounding box 636 is supposed to be encompassing object 256. As a result of bounding boxes being flipped, bounding boxes 632, 634, 636 are positioned at incorrect coordinates in the blended image 630. Bounding box checker 230 can identify the erroneous sizes of bounding boxes 632, 636 using the process and comparisons described with respect to FIG. 3 to FIG. 5.

In FIG. 6D, a blended image 640 that can be outputted by image blender 218 includes objects 252, 254, 256, bounding box 264, and bounding shapes 642, 646. Bounding boxes 264 encompasses object 254 correctly, but bounding shapes 642, 646 are rendered with wrong shapes. For example, bounding shape 642 is a circle, and bounding shape 646 is a triangle, but a predefined bounding box shape is a rectangle. Bounding box checker 230 can identify the erroneous shapes of bounding shapes 642, 646 using the process and comparisons described with respect to FIG. 3 to FIG. 5.

Figure 6F:
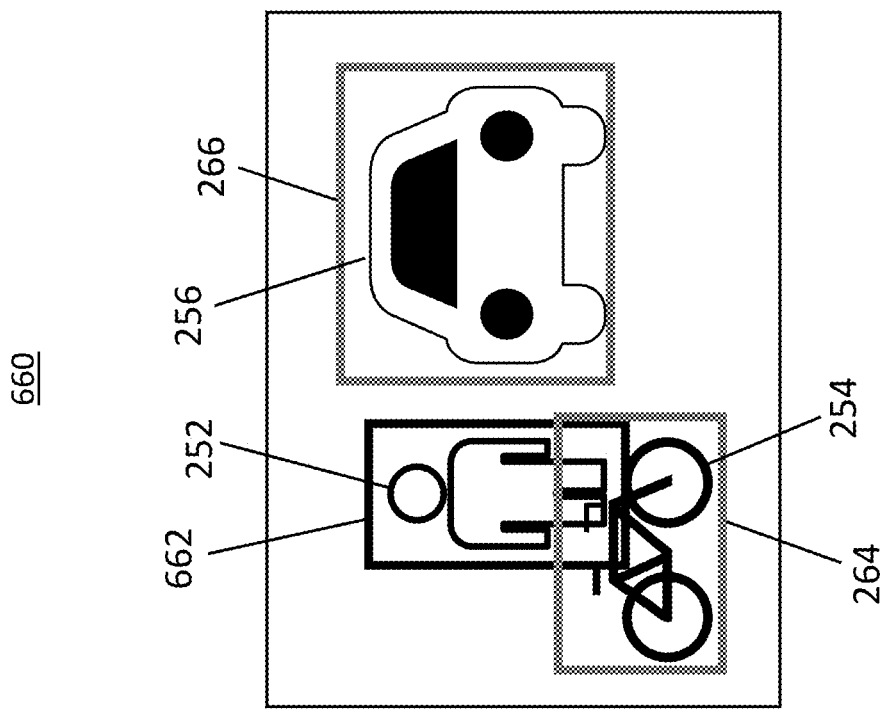
FIG. 6F is a diagram illustrating another example blended image including errors that can be identified by a bounding box checker in one embodiment.
Figure 6E:
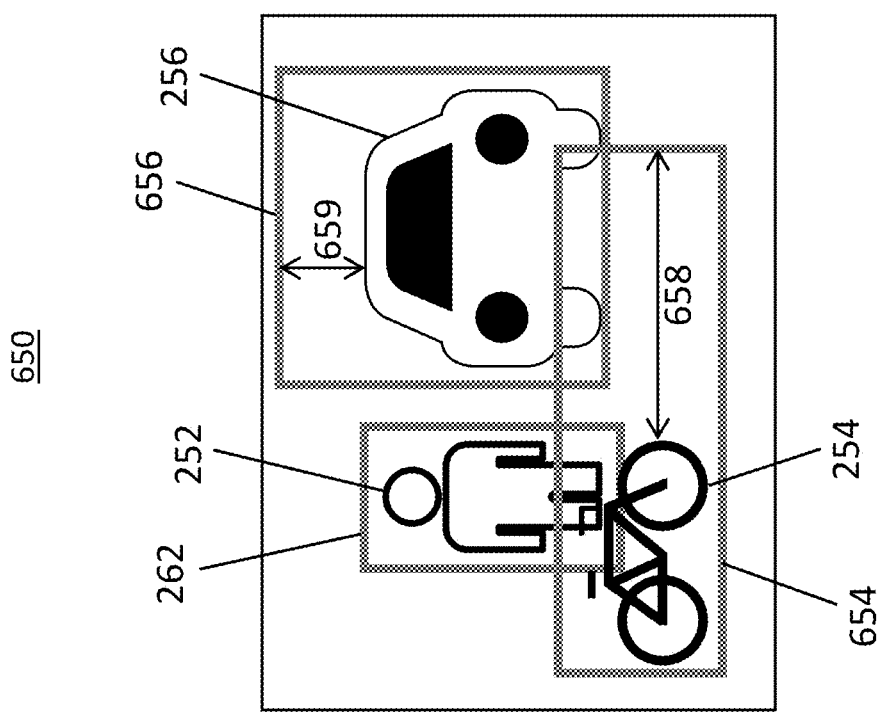
FIG. 6E is a diagram illustrating another example blended image including errors that can be identified by a bounding box checker in one embodiment.

In FIG. 6E, a blended image 650 that can be outputted by image blender 218 includes objects 252, 254, 256 and bounding boxes 262, 654, 656. Bounding box 262 encompasses object 252 correctly, but bounding boxes 654, 656 are rendered with wrong sizes. For example, an offset 658 in the x-direction of coordinate system 223 between a boundary of bounding box 654 and object 254 is larger than a predefined margin or offset (e.g., too wide). Similarly, an offset 659 in the y-direction of coordinate system 223 between a boundary of bounding box 656 and object 256 is larger than a predefined margin or offset (e.g., too long). In some embodiments, a bounding box that overlaps with an object that it is supposed to encompass can indicate that the bounding box may be too small. Bounding box checker 230 can identify the erroneous sizes of bounding boxes 654, 656 using the process and comparisons described with respect to FIG. 3 to FIG. 5.

In FIG. 6F, a blended image 660 that can be outputted by image blender 218 includes objects 252, 254, 256 and bounding boxes 662, 264, 266. Bounding boxes 264, 266 encompass objects 254, 256 correctly and are rendered in one or more predefined colors, but bounding box 662 is rendered in a color different from the predefined color. Bounding box checker 230 can identify the bounding box 362 that is rendered in an incorrect color.

The examples shown in FIG. 6A to FIG. 6F are some example erroneous bounding boxes that can be identified by bounding box checker 230. Bounding box checker 230 can be configured to identify other types of erroneous bounding boxes in addition to the examples shown in FIG. 6A to FIG. 6F using the process and comparisons described with respect to FIG. 3 to FIG. 5.

By integrating bounding box checker 230 in system 100, bounding box errors that may occur due to hardware fault after quality management stage can be alleviated. For example, CPU and GPU hardware faults can be evaluated during quality management stage during production of a chip. However, after integration and when in operation, random hardware faults can occur. Bounding box checker 230 can provide a hardware component integrated on the same chip (e.g., system 100) that can continuously monitor bounding boxes and identify errors. Further, errors identified by bounding box checker 230 can lead to discovery of unknown memory fault, such as corrupted memory that may be storing incorrect predefined bounding box data. Furthermore, bounding box checker 230 can check corners of multiple objects at multiple locations within an image. Still further, bounding box checker 230 can check or evaluate bounding boxes in a blended image without a need to store bounding box data in memory and later retrieve for checking or evaluation by software.

Figure 7:
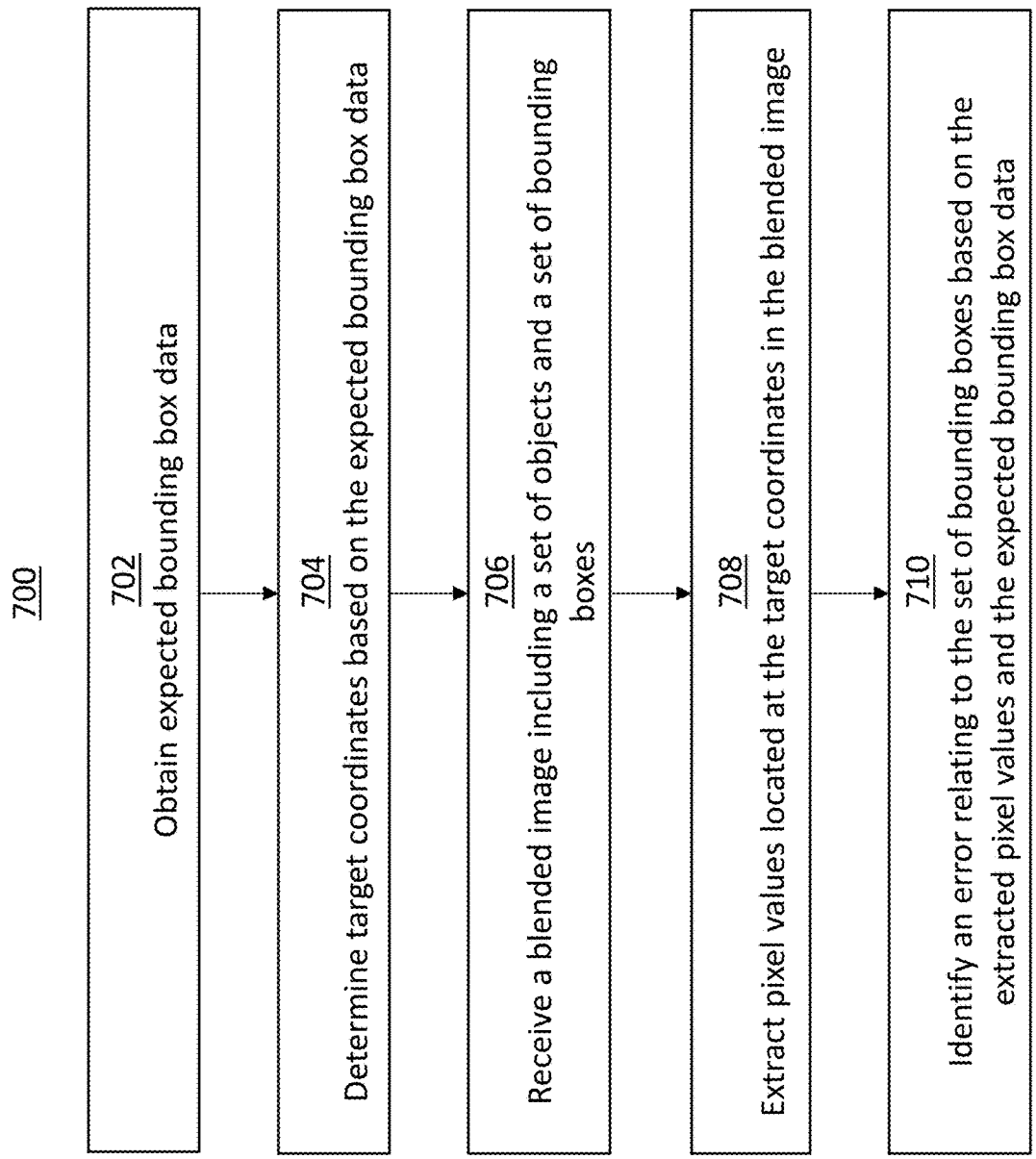
FIG. 7 is a flowchart of an example process that may implement bounding box checker for object detection marking according to an embodiment of the disclosure.

FIG. 7 is a flowchart of an example process that may implement bounding box checker for object detection marking according to an embodiment of the disclosure. Process 700 can be implemented by bounding box checker 230 shown in FIG. 2A and FIG. 2B to evaluate or check a set of bounding boxes in a blended image.

Process 700 can begin at block 702. At block 702, a bounding box checker can obtain expected bounding box data. The expected bounding box data can be based on coordinates data of an image. Process 700 can proceed from block 702 to block 704. At block 704, the bounding box checker can determine target coordinates based on the expected bounding box data.

In one embodiment, the expected bounding box data can include a set of corner coordinates. The bounding box checker can determine target coordinates for each corner coordinate among the set of corner coordinates. In one embodiment, the bounding box checker can determine a first group of target coordinates and a second group of coordinates. The first group of target coordinates and the second group of target coordinates can form the target coordinates. The first group of coordinates can be adjacent to a group of center coordinates in a first direction. The second group of coordinates can be adjacent to the group of center pixels in a second direction orthogonal to the first direction. In one embodiment, the target coordinates can include eight coordinates, and a thickness of the set of bounding boxes can be greater than or equal to four pixels.

Process 700 can proceed from block 704 to block 706. At block 706, the bounding box checker can receive a blended image including a set of objects and a set of bounding boxes. Process 700 can proceed from block 706 to block 708. At block 708, the bounding box checker can extract pixel values located at the target coordinates in the blended image.

Process 700 can proceed from block 708 to block 710. At block 710, the bounding box checker can identify an error relating to the set of bounding boxes based on the extracted pixel values and the expected bounding box data. In one embodiment, the bounding box checker can compare the extracted pixel values with an expected pixel values among the expected bounding box data. In response to a match between every one of the extracted pixel values and the expected pixel values, the bounding box checker can determine that there is no error relating to the set of bounding boxes. In response to a mismatch between at least one of the extracted pixel values and the expected pixel values, the bounding box checker can identify the error relating to the set of bounding boxes. In one embodiment, in response to an identification of the error relating to the set of bounding boxes, the bounding box checker can generate error data indicating a type of the identified error.

The present disclosure can be directed to an apparatus, a system, a method, and/or a computer program product at any possible technical detail level of integration. The computer program product may include a computer readable storage medium (or media) having computer readable program instructions thereon for causing a device or a processing element to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure (e.g., represented by blocks among process 300 in FIG. 3 and blocks among process 700 in FIG. 7) can be program code such as source code, executable code, firmware instructions, configuration data for integrated circuits, object code written in any combination of one or more programming languages including object-oriented programming languages. The computer readable program instructions may execute entirely on a user computer, partly on the user computer, as a stand-alone software package, partly on the user computer and partly on a remote computer or entirely on the remote computer or server. The remote computer can be connected to the local computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods (e.g., FIG. 3, FIG. 7), apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present disclosure have been presented for purposes of illustration and description but are not intended to be exhaustive or limited to the disclosure in the forms disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An integrated circuit comprising:
a processor configured to:
obtain expected bounding box data from a storage device, wherein the expected bounding box data includes coordinates data indicating a set of corner coordinates of one or more expected bounding boxes and an expected pixel value of the one or more expected bounding boxes;
determine target coordinates based on a group of center coordinates offset from the set of corner coordinates by a predefined offset in the expected bounding box data, wherein the group of center coordinates is dependent on a thickness of the one or more expected bounding boxes and the thickness is greater than or equal to four pixels;
receive image data of a blended image including a set of objects and a set of bounding boxes;
extract, from the image data, pixel values of the set of bounding boxes located at the target coordinates in the blended image; and
identify an error relating to the set of bounding boxes based on the extracted pixel values and the expected bounding box data, wherein the error indicates a hardware fault in the storage device.

2. The integrated circuit of claim 1,
wherein the processor is configured to determine the target coordinates for each corner coordinate among the set of corner coordinates.

3. The integrated circuit of claim 1,
wherein the processor is configured to determine a first group of target coordinates and a second group of target coordinates, wherein the first group of target coordinates and the second group of target coordinates form the target coordinates, the first group of coordinates being adjacent to the group of center coordinates in a first direction, and the second group of target coordinates being adjacent to the group of center coordinates in a second direction orthogonal to the first direction.

4. The integrated circuit of claim 1, wherein:
the storage device comprises a set of registers;
the processor is configured to obtain the expected bounding box data from the set of registers; and
the hardware fault is a register file error in the set of registers.

5. The integrated circuit of claim 1, wherein:
the storage device comprises a memory external to the integrated circuit;
the processor is configured to obtain the expected bounding box data from the memory external to the integrated circuit; and
the hardware fault is in the memory.

6. The integrated circuit of claim 1,
wherein to identify the error relating to the set of bounding boxes, the processor is configured to:
compare the extracted pixel values with an expected pixel values among the expected bounding box data;
in response to a match between every one of the extracted pixel values and the expected pixel values, the processor determines there is no error relating to the set of bounding boxes; and
in response to a mismatch between at least one of the extracted pixel values and the expected pixel values, the processor identifies the error relating to the set of bounding boxes.

7. The integrated circuit of claim 1,
wherein the processor is configured to, in response to an identification of the error relating to the set of bounding boxes, send error data indicating a presence of the identified error to an error correction module.

8. A system comprising:
a processor configured to:
generate a bounding box image corresponding to an image;
combine the bounding box image with the image to generate a blended image including a set of objects and a set of bounding boxes; and
an integrated circuit connected to the processor, the integrated circuit being configured to:
obtain expected bounding box data from a storage device, wherein the expected bounding box data includes coordinates data indicating a set of corner coordinates of one or more expected bounding boxes and an expected pixel value of the one or more expected bounding boxes;
determine target coordinates based on a group of center coordinates offset from the set of corner coordinates by a predefined offset in the expected bounding box data, wherein the group of center coordinates is dependent on a thickness of the one or more expected bounding boxes and the thickness is greater than or equal to four pixels;
receive image data of the blended image from the processor;
extract, from the image data, pixel values of the set of bounding boxes located at the target coordinates in the blended image; and
identify an error relating to the set of bounding boxes based on the extracted pixel values and the expected bounding box data, wherein the error indicates a hardware fault in the storage device.

9. The system of claim 8, wherein the processor is configured to determine the target coordinates for each corner coordinate among the set of corner coordinates.

10. The system of claim 8, wherein the processor is configured to determine a first group of target coordinates and a second group of target coordinates, wherein the first group of target coordinates and the second group of target coordinates form the target coordinates, the first group of coordinates being adjacent to the group of center coordinates in a first direction, and the second group of target coordinates being adjacent to the group of center coordinates in a second direction orthogonal to the first direction.

11. The system of claim 8, wherein: the storage device comprises a set of registers; the integrated circuit is configured to store the bounding box in the set of registers; and the hardware fault is a register file error in the set of registers.

12. The system of claim 8, wherein:
the storage device comprises a memory external to the integrated circuit;
the integrated circuit is configured to obtain the expected bounding box data from the memory external to the integrated circuit; and
the hardware fault is in the memory.

13. The system of claim 8,
wherein to identify the error relating to the set of bounding boxes, the integrated circuit is configured to:
compare the extracted pixel values with an expected pixel values among the expected bounding box data;
in response to a match between every one of the extracted pixel values and the expected pixel values, the processor determines there is no error relating to the set of bounding boxes; and in response to a mismatch between at least one of the extracted pixel values and the expected pixel values, the processor identifies the error relating to the set of bounding boxes.

14. The system of claim 8, further comprising an error correction module, wherein the integrated circuit is configured to, in response to an identification of the error relating to the set of bounding boxes, send error data indicating a presence of the identified error to the error correction module.

15. A method for evaluating a set of bounding boxes in a blended image, the method comprising:

obtaining expected bounding box data from a storage device, wherein the expected bounding box data includes coordinates data indicating a set of corner coordinates of one or more expected bounding boxes and an expected pixel value of the one or more expected bounding boxes;

determining target coordinates based on a group of center coordinates offset from the set of corner coordinates by a predefined offset in the expected bounding box data, wherein the group of center coordinates is dependent on a thickness of the one or more expected bounding boxes and the thickness is greater than or equal to four pixels;

receiving image data of a blended image including a set of objects and a set of bounding boxes;

extracting, from the image data, pixel values located at the target coordinates in the blended image; and identifying an error relating to the set of bounding boxes based on the extracted pixel values and the expected bounding box data, wherein the error indicates a hardware fault in the storage device.

16. The method of claim 15, wherein determining target coordinates comprises determining the target coordinates for each corner coordinate among the set of corner coordinates.

17. The method of claim 15, wherein determining target coordinates comprises determining a first group of target coordinates and a second group of target coordinates, wherein the first group of target coordinates and the second group of target coordinates form the target coordinates, the first group of coordinates being adjacent to the group of center coordinates in a first direction, and the second group of target coordinates being adjacent to the group of center coordinates in a second direction orthogonal to the first direction.

18. The method of claim 15, wherein identifying the error relating to the set of bounding boxes comprises:

comparing the extracted pixel values with an expected pixel values among the expected bounding box data;

in response to a match between every one of the extracted pixel values and the expected pixel values, determining there is no error relating to the set of bounding boxes; and in response to a mismatch between at least one of the extracted pixel values and the expected pixel values, identifying the error relating to the set of bounding boxes.

19. The method of claim 15, further comprising, in response to an identification of the error relating to the set of bounding boxes, generating error data indicating a presence of the identified error.

20. The method of claim 15, wherein the target coordinates include eight coordinates.

* * * * *